(12) United States Patent
Brown et al.

(10) Patent No.: US 7,660,826 B2
(45) Date of Patent: Feb. 9, 2010

(54) IMPLEMENTING ADAPTIVE BUFFER MANAGEMENT ON NETWORK FETCHES OF DIRECTORY CONTENTS AND OBJECT ATTRIBUTES

(75) Inventors: William B. Brown, Austin, TX (US); Rodney C. Burnett, Austin, TX (US); Duen-Wen Hsiao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 11/381,149

(22) Filed: May 2, 2006

(65) Prior Publication Data

US 2008/0005181 A1    Jan. 3, 2008

(51) Int. Cl.
G06F 7/00    (2006.01)
(52) U.S. Cl. .................... 707/104.1; 711/118
(58) Field of Classification Search ......... 707/100–102, 707/104.1; 711/118
See application file for complete search history.

(56) References Cited

U.S. PATENT DOCUMENTS

| | | | | |
|---|---|---|---|---|
| 5,371,885 | A * | 12/1994 | Letwin | 707/205 |
| 6,973,542 | B1 * | 12/2005 | Schmuck et al. | 711/137 |
| 2002/0078174 | A1 * | 6/2002 | Sim et al. | 709/219 |
| 2006/0064549 | A1 * | 3/2006 | Wintergerst | 711/134 |

OTHER PUBLICATIONS

Shepler et al., "Network File System (NFS) version 4 Protocol", Apr. 2003, nfsv4.org, 276 pages.*
Dave Olker, "Optimizing NFS Performance: Tuning and Troubleshooting NFS on HP-US Systems", Sep. 13, 2002, Prentice Hall, 2 Pages.*
Pawlowski et al., "The NFS Version 4 Protocol", May 2000, NLUUG, 20 Pages.*
Eisler et al. "Managing NFS and NIS, 2nd Edition", Jul. 2001, O'Reilly, 18 Pages.*
TDB, IBM Corporation: RFC 3010 Section 14.2.24: Operation 26: READDIR—Read Directory, p. 398-400; Dec. 2000.

* cited by examiner

*Primary Examiner*—John R. Cottingham
*Assistant Examiner*—James E Richardson
(74) *Attorney, Agent, or Firm*—Dillon & Yudell LLP

(57) ABSTRACT

A method, system, and computer-usable medium for implementing a file directory in a server. An application including a buffer for retrieving and storing at least one entry is interfaced with the file directory. Utilizing a determined average filename length, an estimate of a number of entries among the collection of entries that can be stored by the buffer is determined. In response to determining at least one attribute data field has been requested, the number of entries that can be stored by the buffer is recalculated. Recalculating the number of entries includes determining an amount of data required for storing the collection of filenames, a collection of fixed-length attribute data fields, and a collection of variable-length attribute data fields. The recalculated number of entries is then requested from the file directory, and the buffer is loaded, with the recalculated number of entries.

17 Claims, 5 Drawing Sheets

IMPLEMENTING ADAPTIVE BUFFER MANAGEMENT ON NETWORK FETCHES OF DIRECTORY CONTENTS AND OBJECT ATTRIBUTES

BACKGROUND OF THE INVENTION

1. Technical Field

The present invention relates in general to the field of data processing systems. More particularly, the present invention relates to retrieving data from a directory stored in a data processing system. Still more particularly, the present invention relates to a system and method for implementing adaptive buffer management on network fetches of directory contents and object attributes.

2. Description of the Related Art

Remote file systems, such as Network File System (NFS) Version 4, provide methods for a client to request file directory information from a server. Along with the file names, various attributes of each entry may be requested. The processing required by the server to provide the various attributes of each entry is costly as the processing involves lookups and other file system operations. Additionally, the amount of data that is transmitted to the client could become massive if attributes are requested for a large number of files. The problems associated with the amount of data to be transmitted become more problematic when the size of the attribute data is not fixed.

Often, it is desired for a client to request a full set of attributes for each directory entry so that a cache table may be configured to bypass further requests to the server. The client must supply a limit on the amount of total data retrieved. If the threshold is set too high, excessive memory allocation can occur. If the threshold is set too low, the number of directory entries returned from the server is limited.

Therefore, there is a need for a system and method to address the above-mentioned limitations of the prior art.

SUMMARY OF THE INVENTION

The present invention includes a method, system, and computer-usable medium for implementing a file directory in a server. The file directory includes a collection of entries each described by a collection of filenames, a collection of fixed-length attribute data fields, and a collection of variable-length attribute fields. An application including a buffer for retrieving and storing at least one entry is interfaced with the file directory. An average filename length among the collection of filenames is determined. Utilizing the determined average filename length, an estimate of a number of entries among the collection of entries that can be stored by the buffer is determined. In response to determining at least one attribute data field among the collection of fixed-length and the collection of variable-length attribute data fields has been requested, the number of entries that can be stored by the buffer is recalculated. Recalculating the number of entries includes determining an amount of data required for storing the collection of filenames, the collection of fixed-length attribute data fields, and the collection of variable-length attribute data fields. The recalculated number of entries is then requested from the file directory, and the buffer is loaded, with the recalculated number of entries.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
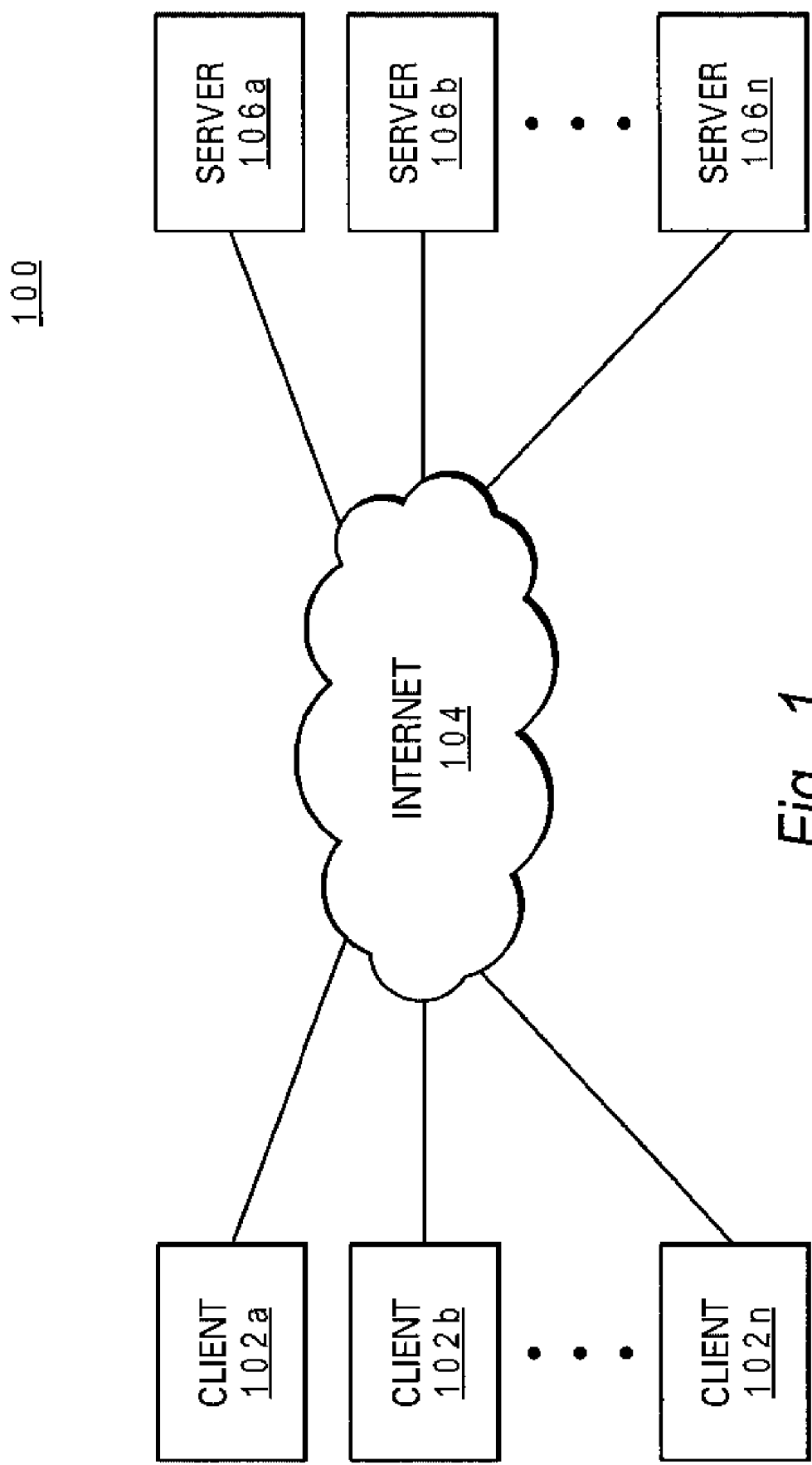
FIG. 1 is a block diagram depicting an exemplary network in which a preferred embodiment of the present invention may be implemented.
Figure 2:
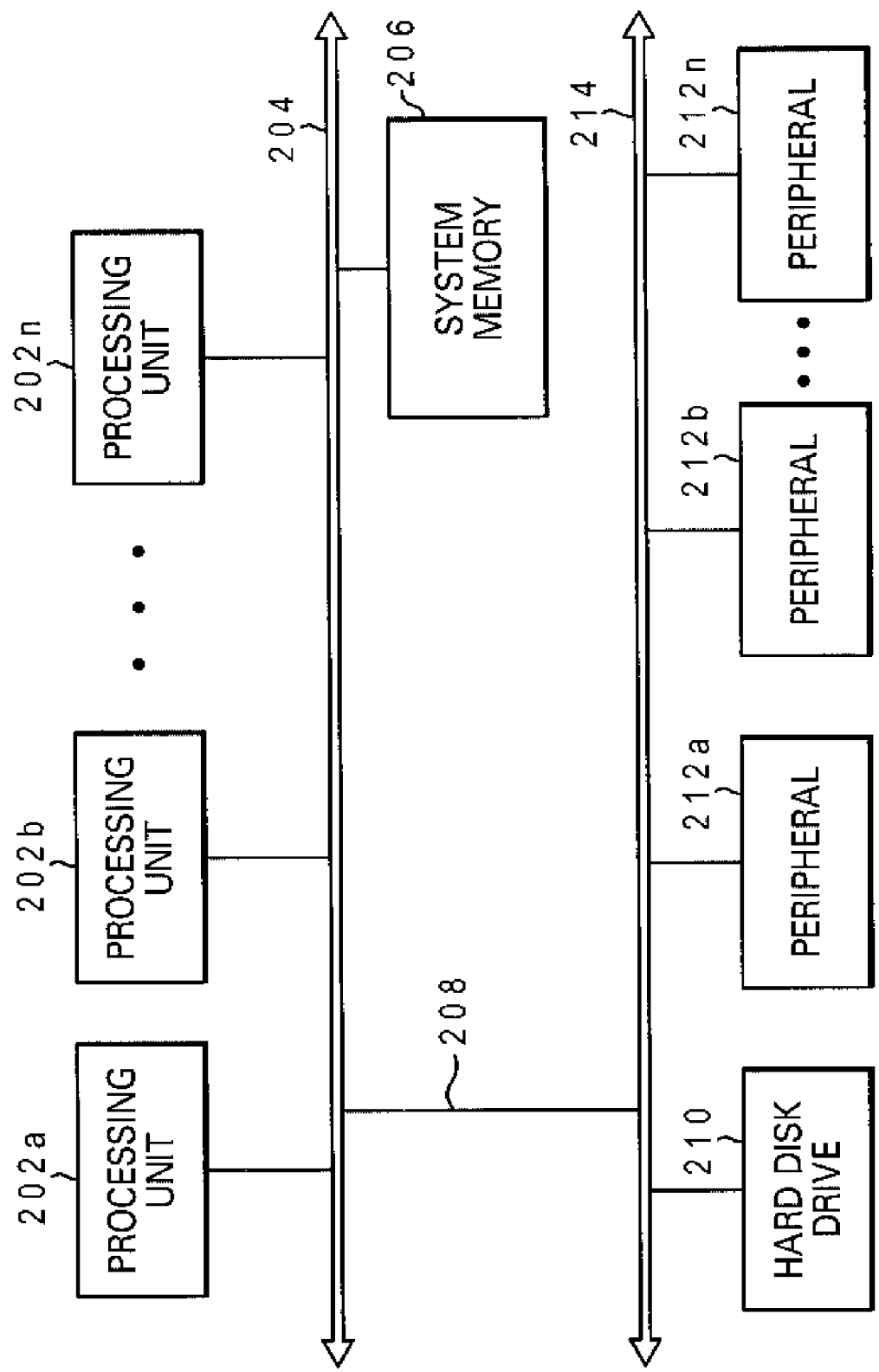
FIG. 2 is a block diagram illustrating an exemplary data processing system in which a preferred embodiment of the present invention may be implemented.

Referring now to the figures, and in particular, referring to FIG. 1, there is illustrated a block diagram depicting an exemplary network environment 100 in which a preferred embodiment of the present invention may be implemented. As illustrated. FIG. 1 includes clients 102a-n, network 104, and servers 106a-n. As discussed herein in more detail in conjunction with FIG. 2, clients 102a-n and servers 106a-n each may be implemented utilizing a respective data processing system 200, as depicted in FIG. 2. Servers 106a-n provide data or other information in response to requests from clients 102a-n. Coupling clients 102a-n and servers 106a-n is network 104, which may be implemented by a local-area network (LAN) or a wide-area network (WAN) utilizing Ethernet, wireless (e.g., IEEE 802.11x), or any other type of network connection.

Those skilled in the art will appreciate that network environment 100 can include many additional components not specifically illustrated in FIG. 1. Because such additional components are not necessary for an understanding of the present invention, they are not illustrated in FIG. 1 or discussed further herein.

FIG. 2 is a block diagram depicting an exemplary data processing system 200 in which a preferred embodiment of the present invention may be implemented. Those with skill in the art will appreciate that each of clients 102a-n and servers 106a-n may be implemented by a data processing system like data processing system 200. As depicted, exemplary data processing system 200 includes processing unit(s) 202a-n, which are coupled to system memory 206 via system bus 204. Preferably, system memory 206 may be implemented as a collection of dynamic random access memory (DRAM) modules. Typically, system memory 206 includes data and instructions for running a collection of applications. Mezzanine bus 208 acts as an intermediary between system bus 204 and peripheral bus 214. Those with skill in this art will appreciate that peripheral bus 214 may be implemented as a peripheral component interconnect (PCI), accelerated graphics port (AGP), or any other peripheral bus. Coupled to peripheral bus 214 is hard disk drive 210, which is utilized by data processing system 200 as a mass storage device. Also coupled to peripheral bus 214 is a collection of peripherals 212a-n.

Those skilled in the art will appreciate that data processing system 200 can include many additional components not specifically illustrated in FIG. 2. Because such additional components are not necessary for an understanding of the present invention, they are not illustrated in FIG. 2 or discussed further herein. It should also be understood, however, that the enhancements to data processing system 200 for implementing adaptive buffer management on network fetches of directory contents and object attributes provided by the present invention are applicable to data processing systems of any system architecture and are in no way limited to the generalized multi-processor architecture or symmetric multi-processing (SMP) architecture illustrated in FIG. 2.

Figure 3A:
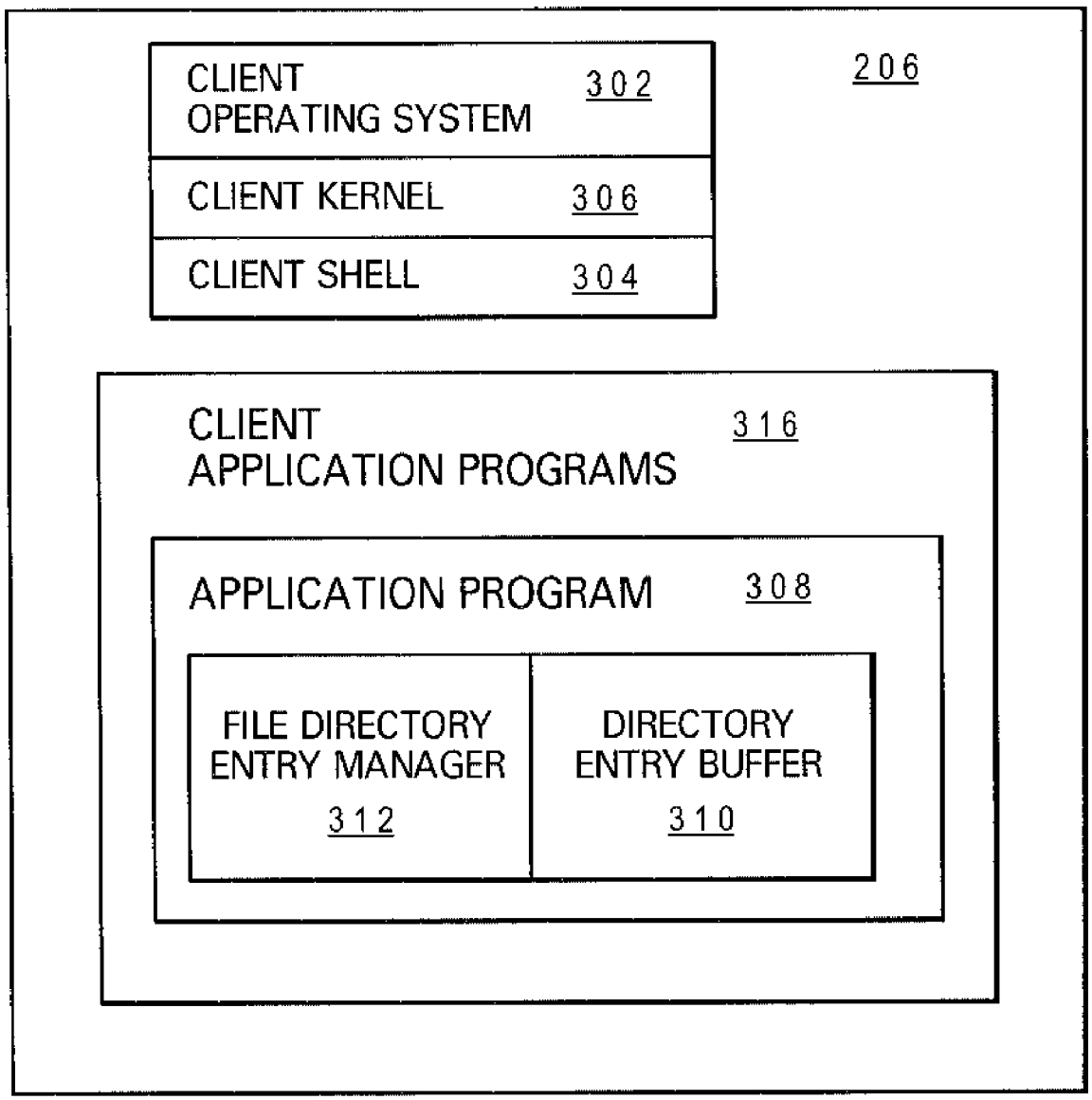
FIG. 3A is a block diagram depicting exemplary contents of the system memory of clients 102a-n according to a preferred embodiment of the present invention.

FIG. 3A is a block diagram illustrating exemplary contents of system memory 206 of clients 102a-n, according to a preferred embodiment of the present invention. As illustrated, system memory 206 includes client operating system 302, which further includes client shell 304 for providing transparent user access to resources such as client application programs 316. Generally, client shell 304 is a program that provides an interpreter and an interface between the user and the operating system. More specifically, client shell 304 executes commands that are entered into a command line user interface or a file. Thus, client shell 304 (as it is called in UNIX®), also called a command processor in Windows®, is generally the highest level of the operating system software hierarchy and serves as a command interpreter. Client shell 304 provides a system prompt, interprets commands entered by keyboard, mouse, or other user input device, and sends the interpreted command(s) to the appropriate lower levels of the operating system (e.g., client kernel 306) for processing. Note that while client shell 304 is a text-based, line-oriented user interface, the present invention is equally applicable to other user interface modes, such as graphical, voice, gestural, etc.

As illustrated, client operating system 302 also includes client kernel 306, which includes lower levels of functionality for client operating system 302, including providing essential services required by other parts of client operating system 302 and client application programs 316, including memory management, process and task management, disk management, and mouse and keyboard management. Client application programs 316 can include, but are not limited to, a browser utilized to access the Internet, word processors, and spreadsheets. Application program 308 and directory entry buffer 310 access file directory 360 (depicted in FIG. 3B) via file directory entry manager 312, discussed herein in more detail in conjunction with FIG. 3B and FIG. 4.

Figure 3B:
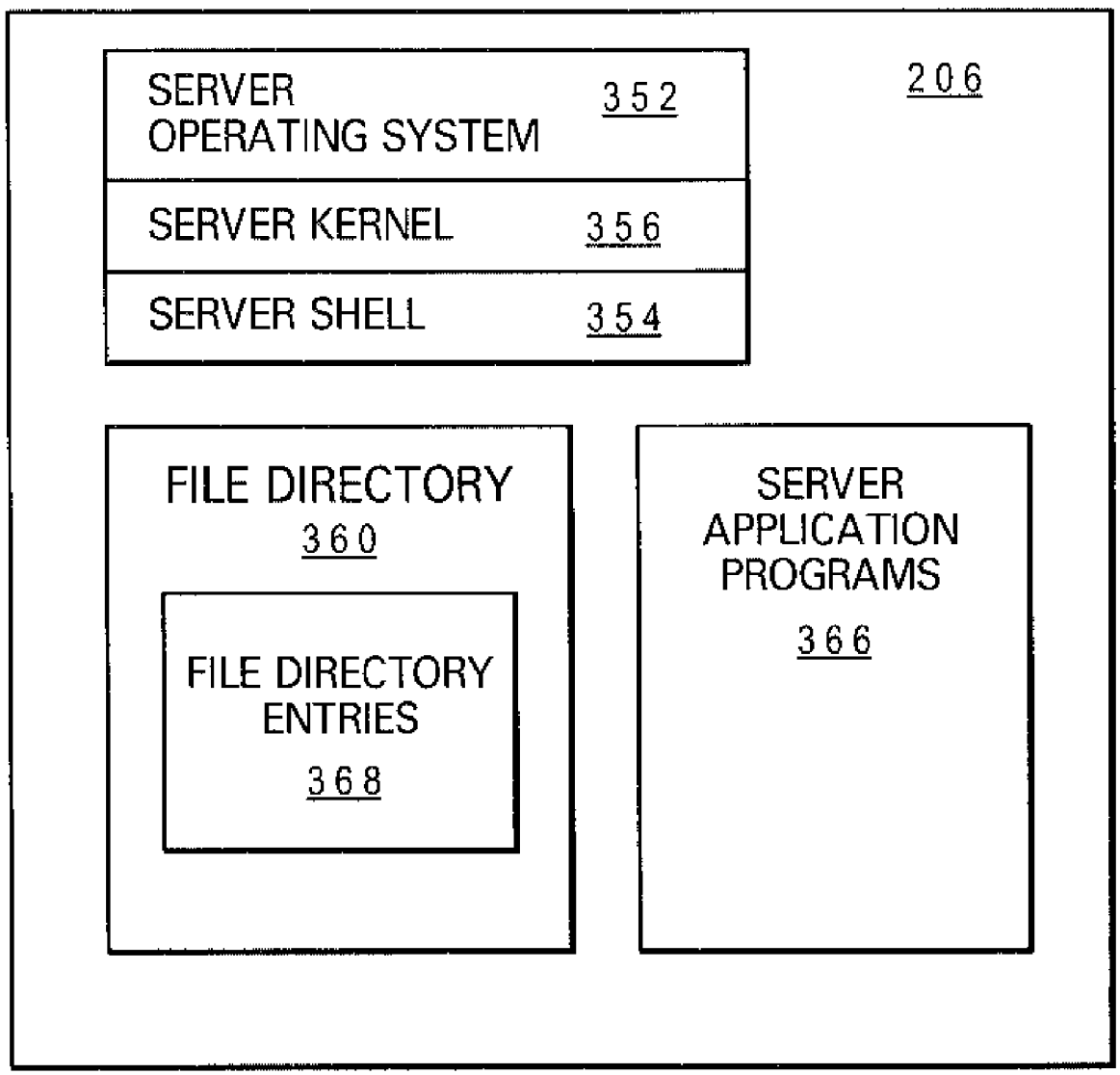
FIG. 3B is a block diagram illustrating exemplary contents of the system memory of servers 106a-n.

FIG. 3B is a block diagram illustrating exemplary contents of system memory 206 of servers 106a-n, according to a preferred embodiment of the present invention. As illustrated, system memory 206 includes server operating system 352, which further includes server shell 354 for providing transparent user access to resources such as server application programs 366. Generally, server shell 354 is a program that provides an interpreter and an interface between the user and the operating system. More specifically, server shell 354 executes commands that are entered into a command line user interface or a file. Thus, server shell 354 (as it is called in UNIX®), also called a command processor in Windows®, is generally the highest level of the operating system software hierarchy and serves as a command interpreter. Server shell 354 provides a system prompt, interprets commands entered by keyboard, mouse or other user input device, and sends the interpreted command(s) to the appropriate lower levels of the operating system (e.g., server kernel 356) for processing. Note that while server shell 354 is a text-based, line-oriented user interface, the present invention is equally applicable to other user interface modes, such as graphical, voice, gestural, etc.

As illustrated, server operating system 352 also includes server kernel 356, which includes lower levels of functionality for server operating system 352, including providing essential services required by other parts of server operating system 352 and server application programs 366, including memory management, process and task management, disk management, and mouse and keyboard management. Server application programs 366 can include, but are not limited to, a browser utilized for accessing the Internet, word processors, and spreadsheets. System memory 206 of servers 106a-n include file directory 360, which interfaces with application program 308 (illustrated in FIG. 3A) to send directory entries 368 to directory entry buffer 310 when requested by file directory entry manager 362.

Figure 4:
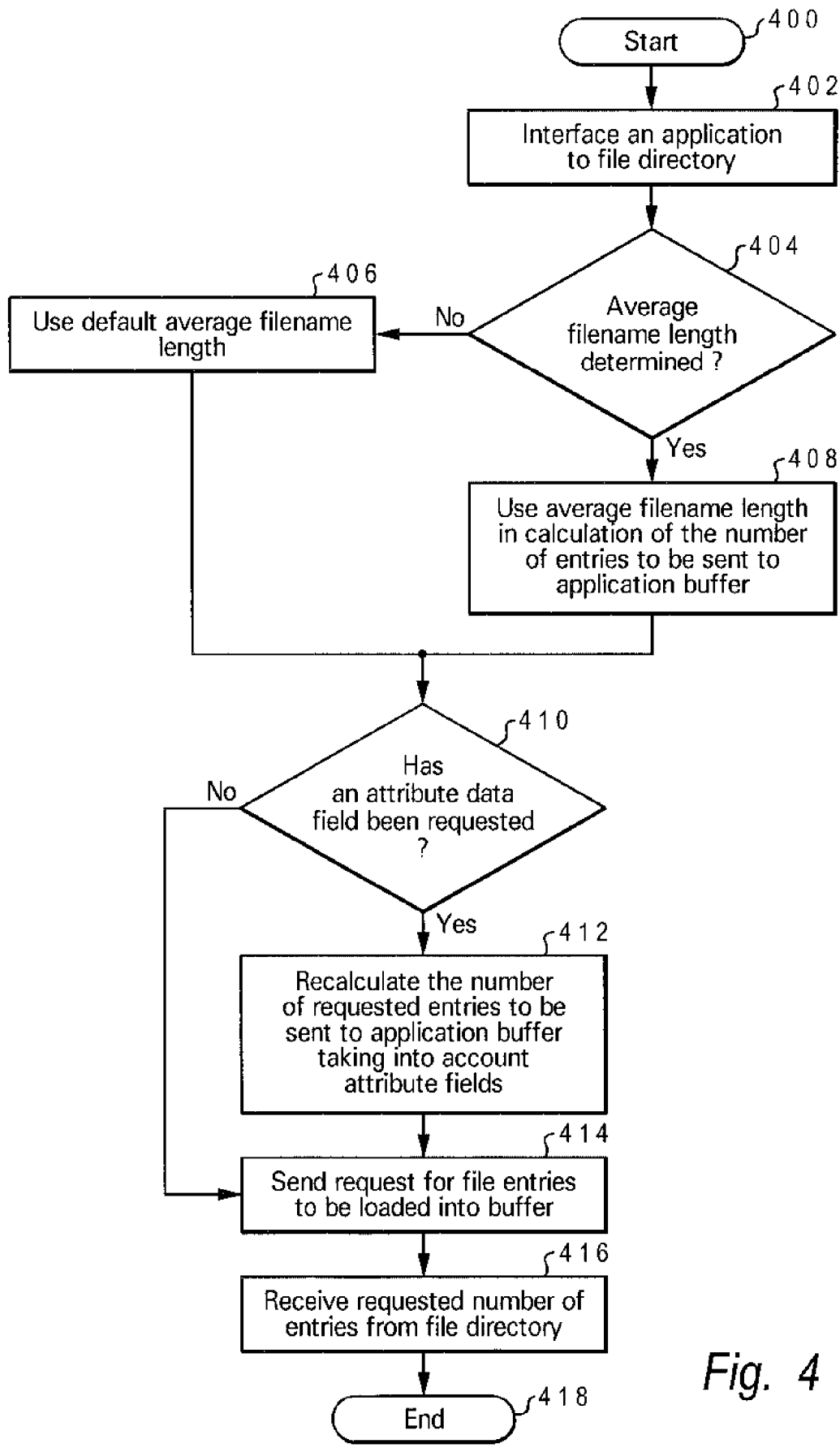
FIG. 4 is a high-level logical flowchart illustrating an exemplary method for implementing adaptive buffer management on network fetches of directory contents and object attributes according to a preferred embodiment of the present invention.

FIG. 4 is a high-level logical flowchart illustrating an exemplary method for implementing adaptive buffer management for network fetches of directory contents and object attributes according to a preferred embodiment of the present invention. The process begins at step 400 and proceeds to step 402, which illustrates application program 308 interfacing with file directory 360 to retrieve a number of file directory entries 368 by preparing a READDIR request.

The READDIR operation arguments include data size limits for directory information (including the file name) and the file attributes. The ultimate output of this operation is an array of directory entries 368 that is returned to directory entry buffer 310. As previously discussed, it is preferable for directory entry buffer 310 to receive an appropriate number of directory entries to fill the buffer after a READDIR request. Therefore, file directory entry manager 312 must calculate an optimal number of directory entries 368 to request from file directory 360. If file directory entry manager 312 requests too many directory entries 368, the requesting client 102a-n will spend extra processing power to process the extra entries. If file directory entry manager 312 requests too few directory entries 368, directory entry buffer 310 is not efficiently utilized, which requires application program 308 to request additional file directory entries 368 more frequently, thus wasting bandwidth on network 104 and processing power of client 102a-n.

To determine the optimal number of directory entries 368 to request file directory entry manager 312 determines if an average filename length of directory entries 368 has been determined, as illustrated in step 404. The average filename length value is determined by prior accesses to file directory 360. If file directory 360 has not been accessed in the past, there are no available data to determine the average filename length. The process then transitions to step 406, which illustrates file directory entry manager 362 utilizing a default (or predetermined) average filename length to perform the calculation of the number of directory entries 368 to be requested. The process proceeds to step 410.

Returning to step 408, if an average filename length has been determined, the average filename length is utilized by file directory entry manager 312 to calculate the number of entries requested. The process proceeds to step 410, which illustrates file directory entry manager 312 determining if attribute data files have been requested from file directory 360. In a preferred embodiment of the present invention, the READDIR request allows a fixed set of attributes for each entry to be returned. To determine if file attributes should be included in a READDIR request, a check is made to see if any LOOKUP operations have been made utilizing file directory 360 as a base. If no LOOKUP operation has been made since the last READDIR operation for the same directory, it is assumed by file directory entry manager 312 that application program 308 is only interested in the file names. Consequently, no attributes are requested in the READDIR command. The process proceeds to step 414, which illustrates file directory entry manager 312 sending the READDIR command to file directory 360. The process continues to step 416, which depicts directory entry buffer 310 receiving the requested number of directory entries from file directory 360. Thereafter, the process ends, as depicted in step 418.

Returning to step 410, if an attribute data field has been previously requested (via a LOOKUP function), a full set of attributes is requested to enable the requesting client to populate attribute caches for the returned directory entries. The process then proceeds to step 412, which illustrates file directory entry manager 312 recalculating the number of entries requested to be sent to application buffer taking into account attribute fields. In a preferred embodiment of the present invention, if a full set of directory attributes are being requested, the total number of entries requested accounts for the data size of the fixed-length attribute data fields, an estimate of the variable-length attribute data fields (e.g., file-handle data, owner name, owner group name, etc.), and the average filename length determined in steps 404 and 408. The process then continues to step 414, which illustrates the READDIR request sent to file directory 360. The requested number of directory entries are then sent from file directory 360 to directory entry buffer 310, as depicted in step 416, and the process ends, as illustrated in step 418.

In another preferred embodiment of the present invention, if the size of the directory is known, and the size is less than some predetermined value, a full set of file attributes is always requested regardless of how many LOOKUP functions have been performed on the particular directory. Also, if during a request of a full set of attributes an error occurs that prevents file directory 360 from returning the attributes, the requesting client (e.g., client 102a) retries the request with no attributes in order to satisfy the request of the application program 308.

As discussed, the present invention includes a method, system, and computer-usable medium for implementing a file directory in a server. The file directory includes a collection of entries each described by a collection of filenames, a collection of fixed-length attribute data fields, and a collection of variable-length attribute fields. An application including a buffer for retrieving and storing at least one entry is interfaced with the file directory. An average filename length among the collection of filenames is determined. Utilizing the determined average filename length, an estimate of a number of entries among the collection of entries that can be stored by the buffer is determined. In response to determining at least one attribute data field among the collection of fixed-length and the collection of variable-length attribute data fields has been requested, the number of entries that can be stored by the buffer is recalculated. Recalculating the number of entries includes determining an amount of data required for storing the collection of filenames, the collection of fixed-length attribute data fields, and the collection of variable-length attribute data fields. The recalculated number of entries is then requested from the file directory, and the buffer is loaded, with the recalculated number of entries.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A method of implementing a file directory, said method comprising:
    determining an average filename length among a plurality of filenames that describes one of a plurality of entries in the file directory, wherein the file directory includes the plurality of entries each described by a plurality of filenames, a plurality of fixed-length attribute data fields, and a plurality of variable-length attribute data fields in a server and interfacing, with said file directory, an application including a buffer, separate from the file directory and storage thereof, for retrieving and storing at least one entry among said plurality of entries;
    utilizing said determined average filename length to estimate a number of entries among said plurality of entries that can be stored by said buffer;
    determining that at least one attribute data field among said plurality of fixed-length and said plurality of variable-length attribute data fields has been requested;
    in response to determining at least one attribute data field among said plurality of fixed-length and said plurality of variable-length attribute data fields has been requested, recalculating said number of entries among said plurality of entries that can be stored by said buffer, wherein said recalculating includes an amount of data required for storing said plurality of filenames, said plurality of fixed-length attribute data fields, and said plurality of variable-length attribute data fields;
    requesting said recalculated number of entries from said file directory; and
    loading said buffer with said recalculated number of entries.

2. The method according to claim 1, further comprising:
    determining that a size of said file directory is known and said size is less than a predetermined value; and
    in response to determining a size of said file directory is known and said size is less than a predetermined value, requesting a full attribute set associated with each of said plurality of entries retrieved from said file directory.

3. The method according to claim 2, further comprising:
   in response to said requesting a full attribute set associated with each of said plurality of entries, receiving an error from said file directory from retuning said full attribute set; and
   in response to receiving said error, receiving said recalculated number of entries without said full attribute set.

4. The method according to claim 1, wherein said plurality of variable-length attribute data files further comprise:
   a filehandle data field;
   an owner name field; and
   an owner-group field.

5. The method according to claim 1, further comprising:
   requesting said at least one attribute data field among said plurality of fixed-length and said plurality of variable-length attribute data fields by issuing a LOOKUP operation.

6. The method according to claim 1, wherein said average filename length is determined by prior accesses to said filed directory.

7. A system for implementing a file directory in a server, said system comprising:
   at least one processing unit;
   a storage device coupled to said at least one processing unit;
   a file directory maintained on the storage device that includes a plurality of entries each described by a plurality of filenames, a plurality of fixed-length attribute data fields, and a plurality of variable-length attribute data fields;
   an application executing on the at least one processing unit, and interfacing with said file directory, the application including a buffer, separate from the file directory and storage thereof, for retrieving and storing at least one entry among said plurality of entries; and
   a tangible computer-usable medium embodying computer program code, said computer program code comprising instructions executable by said at least one processing unit and configured for:
   determining an average filename length among said plurality of filenames;
   utilizing said determined average filename length to estimate a number of entries among said plurality of entries that can be stored by said buffer;
   determining that at least one attribute data field among said plurality of fixed-length and said plurality of variable-length attribute data fields has been requested;
   in response to determining at least one attribute data field among said plurality of fixed-length and said plurality of variable-length attribute data fields has been requested, recalculating said number of entries among said plurality of entries that can be stored by said buffer, wherein said recalculating includes an amount of data required for storing said plurality of filenames, said plurality of fixed-length attribute data fields, and said plurality of variable-length attribute data fields;
   requesting said recalculated number of entries from said file directory; and
   loading said buffer with said recalculated number of entries.

8. The system according to claim 7, wherein said instructions are further configured for:
   Determining that a size of said file directory is known and said size is less than a predetermined value; and
   in response to determining a size of said file directory is known and said size is less than a predetermined value, requesting a full attribute set associated with each of said plurality of entries retrieved from said file directory.

9. The system according to claim 8, wherein said instructions are further configured for:
   in response to said requesting a full attribute set associated with each of said plurality of entries, receiving an error from said file directory from returning said full attribute set; and
   in response to receiving said error, receiving said recalculated number of entries without said full attribute set.

10. The system according to claim 7, wherein said plurality of variable-length attribute data files further comprise:
    a filehandle data field;
    an owner name field; and
    an owner-group field.

11. The system according to claim 9, wherein said instructions are further configured for:
    requesting said at least one attribute data field among said plurality of fixed-length and said plurality of variable-length attribute data fields by issuing a LOOKUP operation.

12. The system according to claim 7, wherein said average filename length is determined by prior accesses to said filed directory.

13. A tangible computer-usable medium embodying computer program code for implementing a file directory in a server, said computer program code comprising computer executable instructions configured for:
    determining an average filename length among a plurality of filenames that describes one of a plurality of entries in the file directory, wherein the file directory includes the plurality of entries each described by a plurality of filenames, a plurality of fixed-length attribute data fields, and a plurality of variable-length attribute data fields in a server and interfacing, with said file directory, an application including a buffer, separate from the file directory and storage thereof, for retrieving and storing at least one entry among said plurality of entries;
    estimating, by utilizing said determined average filename length, a number of entries among said plurality of entries that can be stored by said buffer;
    determining that at least one attribute data field among said plurality of fixed-length and said plurality of variable-length attribute data fields has been requested;
    in response to determining at least one attribute data field among said plurality of fixed-length and said plurality of variable-length attribute data fields has been requested, recalculating said number of entries among said plurality of entries that can be stored by said buffer, wherein said recalculating includes an amount of data required for storing said plurality of filenames, said plurality of fixed-length attribute data fields, and said plurality of variable-length attribute data fields;
    requesting said recalculated number of entries from said file directory; and
    loading said buffer with said recalculated number of entries.

14. The computer-usable medium according to claim 13, wherein said embodied computer program code further comprises computer executable instructions configured for:
    determining that a size of said file directory is known and said size is less than a predetermined value; and
    in response to determining a size of said file directory is known and said size is less than a predetermined value, requesting a full attribute set associated with each of said plurality of entries retrieved from said file directory.

15. The computer-usable medium according to claim 14, wherein said embodied computer program code further comprises computer executable instructions configured for:

in response to said requesting a full attribute set associated with each of said plurality of entries, receiving an error from said file directory from returning said full attribute set; and in response to receiving said error, receiving said recalculated number of entries without said full attribute set.

16. The computer-usable medium according to claim 13, wherein said plurality of variable-length attribute data files further comprise:

a filehandle data field;

an owner name field; and an owner-group field.

17. The computer-usable medium according to claim 11, wherein said average filename length is determined by prior accesses to said filed directory.

* * * * *

UNITED STATES PATENT AND TRADEMARK OFFICE
CERTIFICATE OF CORRECTION

PATENT NO. : 7,660,826 B2
APPLICATION NO. : 11/381149
DATED : February 9, 2010
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Thirtieth Day of November, 2010

David J. Kappos
*Director of the United States Patent and Trademark Office*